No. 635,283. Patented Oct. 24, 1899.
J. ADAIR.
RACK FOR PENHOLDERS, &c.
(Application filed Dec. 2, 1898.)

(No Model.) 3 Sheets—Sheet 1.

WITNESSES:
Chas. F. Miller.
F. M. Dapper.

INVENTOR,
James Adair
by Damon S. Wolcott
Att'y.

No. 635,283. Patented Oct. 24, 1899.
J. ADAIR.
RACK FOR PENHOLDERS, &c.
(Application filed Dec. 2, 1898.)
(No Model.) 3 Sheets—Sheet 2.
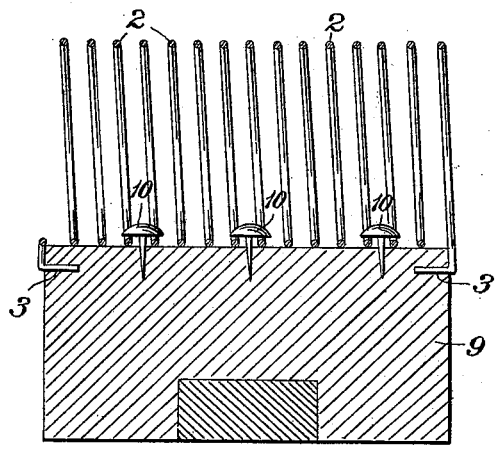
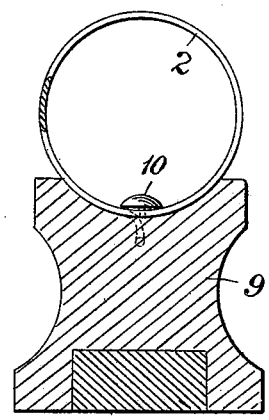
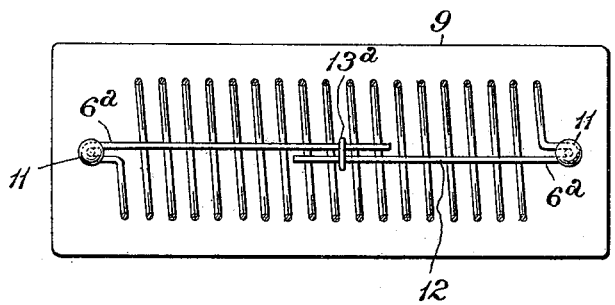
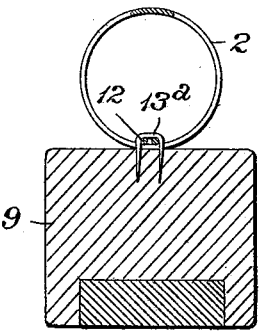
WITNESSES: INVENTOR, No. 635,283. Patented Oct. 24, 1899.
J. ADAIR.
RACK FOR PENHOLDERS, &c.
(Application filed Dec. 2, 1898.)
(No Model.) 3 Sheets—Sheet 3.

WITNESSES:
Chas. F. Miller.
F. M. Dapper.

INVENTOR,
James Adair
by Darwin S. Wolcott
Att'y.

THE NORRIS PETERS CO., PHOTO-LITHO., WASHINGTON, D. C.

UNITED STATES PATENT OFFICE.

JAMES ADAIR, OF LEET, PENNSYLVANIA.

RACK FOR PENHOLDERS, &c.

SPECIFICATION forming part of Letters Patent No. 635,283, dated October 24, 1899.

Application filed December 2, 1898. Serial No. 698,063. (No model.)

*To all whom it may concern:*

Be it known that I, JAMES ADAIR, a citizen of the United States, residing at Leet township, in the county of Allegheny and State of Pennsylvania, have invented or discovered certain new and useful Improvements in Racks for Penholders, &c., of which improvements the following is a specification.

The invention described herein relates to certain improvements in that class or kind of racks for penholders, pencils, &c., having fingers formed of a series of coils of resilient wire or suitably-bent narrow strips.

The invention has for its object the combination of such clamping-fingers with suitable means whereby the rack may be quickly and easily attached to and removed from its base or support; and it is also an object of the invention to provide for the holding of the intermediate coils or fingers of the rack in proper relation to each other and to the base or support, and other features of construction, as hereinafter more fully described and claimed.

Figure 1:
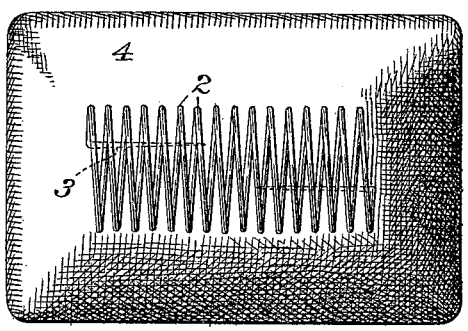
Figure 2:
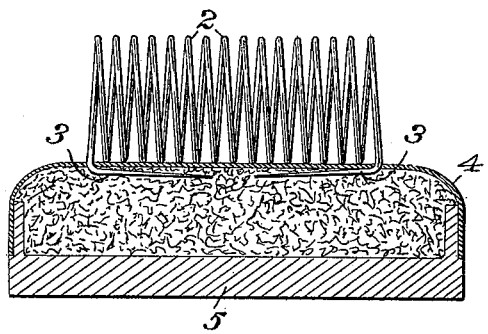
Figure 3:
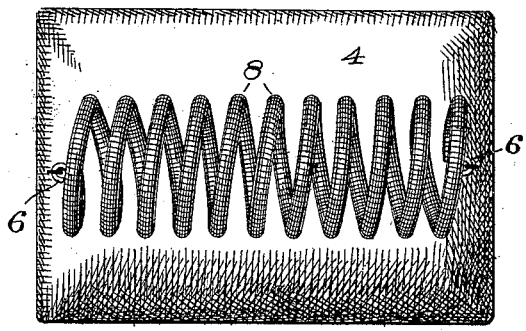
Figure 4:
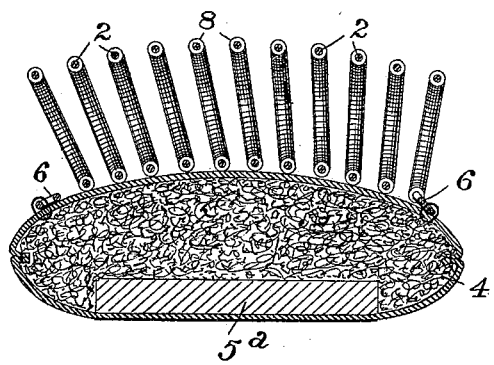
Figure 9:
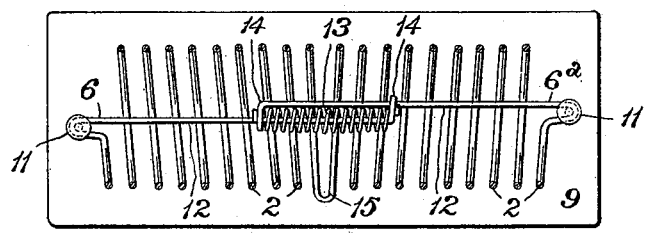
Figure 10:
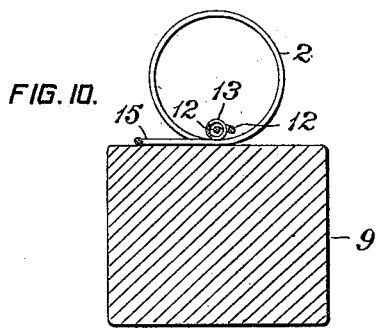
Figure 11:
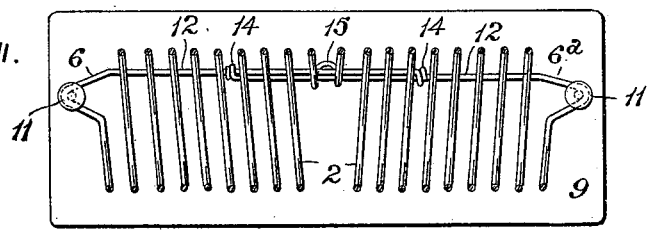
Figure 12:
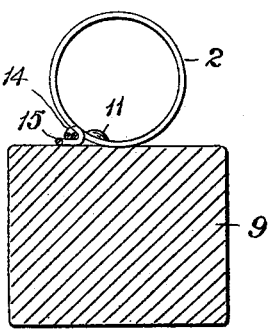

In the accompanying drawings, forming a part of this specification, Figure 1 is a top plan view; Fig. 2, a sectional elevation showing my improvement applied or attached to a padded cushion serving as a support. Figs. 3 and 4 are views similar to Figs. 1 and 2, illustrating a modification in the construction of the rack and in the manner of attaching it to its base or support. Figs. 5 and 6 are longitudinal and transverse sections illustrating modifications in the construction of the rack and its attachment to the base or support. Figs. 7 and 8 are plan and sectional elevations of a further modification in the rack as regards its connection to the base and the manner of clamping the intermediate fingers. Figs. 9 and 11 are plan views, and Figs. 10 and 12 are sectional elevations of further modifications.

In the practice of my invention the resilient fingers are formed by suitably bending a piece of strong wire or narrow metal strip in such manner as to form a series of fingers 2, each finger being an integral part of a continuous flexible extensible structure. A convenient manner of forming the fingers consists in bending a piece of wire of suitable length in spiral coils around a suitable core or mandrel from which the coils are subsequently removed. In order to attach these fingers to a base or foundation, the end coils or fingers are provided with prongs 3, sharpened at their ends and projecting toward each other below the coil. The coil with the pointed prongs can be attached to a suitable foundation—such, for example, as a pincushion 4—by stretching the coil and forcing the pins into the top of the cushion, as shown in Figs. 1 and 2. This cushion may be formed on a block 5 in case the cushion is not sufficiently large or the filling sufficiently heavy to form a suitable support for the rack, or a weight $5^a$, formed of a block of metal, may be incorporated in the cushion, as shown in Fig. 4.

In lieu of the prongs 3 the end coils or fingers may be provided with eyes 6, whereby the coil may be attached by stitches to the base or support or caused to engage a hook or other projection on the support, as shown in Figs. 4 and 7.

In order to increase the gripping action of the fingers or coils, their surfaces may be roughened or formed with projections, or the coils or fingers may be covered in any desired manner to increase frictional engagement—as, for example, with beads 8, which preferably have a roughened surface, as shown in Figs. 3 and 4. In addition to increasing the gripping action the beads, which may be of any color or material, will add an ornamental effect to the rack.

As shown in Figs. 5 and 6, the rack may be attached to a block 9, formed of metal or wood in which a curved seat for the coils or fingers is formed. The coils or fingers are secured in position and held separate from each other by means of prongs 3, inserted in holes formed in the ends of the block, or if the block is of sufficiently soft material, such as wood, the prongs may be driven without forming holes for their reception. In order to prevent a lateral movement of the intermediate coils or fingers, they may be detachably secured to their base or support at suitable intervals by any suitable device—such, for example, as broad-headed tacks 10, driven into the block, as shown in Figs. 5 and 6.

In the construction shown in Figs. 6 and 7 the end fingers or coils are provided with eyes $6^a$ to engage pins or projections 11 on the base or support, and the ends of the wire or strip from which the coils are formed are inserted into the coils and are made of sufficient length to overlap each other when the coils or fingers are separated for attachment to the base or support. These inwardly-projecting holding-bars 12 are placed alongside of each other and then secured to the base or support by any suitable means—such, for example, as a double-pointed tack 13, which serves to draw the bars down toward the base or support, and thereby clamp the intermediate coils or fingers between such bars and the base or support and firmly hold, but in a detachable manner, the intermediate coils in proper relation to each other and to the base. The end of each bar 12 may be bent to form an eye or collar around the other bar, as shown in Fig. 9, and as the retractile power of the coils or fingers is not very great and the eyes 6 on the end fingers might therefore become detached from the pins or projections a spiral spring 13 may be arranged around the overlapping portions of the prongs, so as to bear against the eyes or collars 14. The expansive power of this spring will assist in holding the eyes 6 on the projections on the blocks.

A desirable manner of forming the coils or fingers is shown in Figs. 9 and 11 and consists in bending the wire from which the coils are to be formed midway of its length, so as to form two strands, and then wrapping the two strands, commencing from the loop or ends, around the core or mandrel with opposite inclinations or pitch. The double or looped portion 15 of such coil may be made tangential to the coils, as shown in Figs. 9 and 10, so as to form a stop as against the rolling of the coil on its base or support, such tangential portion being attached to the base by a tack or other suitable means, or the looped portion 15 may be bent around the overlapping portions of the inwardly-projecting bars, as shown in Fig. 11.

It is characteristic of my improvement that the rack can be readily attached to or removed from its base or support, and I do not, therefore, as regards the broad terms of the claims hereinafter made, limit myself to the construction shown and described for effecting such detachable connections between the rack and base or support, as many other forms or constructions of such connection would readily suggest themselves to those skilled in the art.

I claim herein as my invention—

1. In a rack for penholders, &c., the combination of a base or support and a series of fingers or coils the end coils being provided with means whereby they may be detachably connected directly to the base or support, substantially as set forth.

2. In a rack for penholders, &c., the combination of a base or support and a series of fingers or coils the end coils being provided with eyes adapted to be detachably connected directly to the base or support, substantially as set forth.

3. In a rack for penholders, &c., the combination of a base or support provided with projections and a series of fingers or coils the end coils being provided with eyes adapted to engage the projections on the base or support, substantially as set forth.

4. In a rack for penholders, &c., the combination of a base or support provided with projections, a series of fingers or coils provided with eyes adapted to engage said projections and holding-bars extending from the eyes into the coils and bearing on the intermediate coils, substantially as set forth.

5. In a rack for penholders, &c., the combination of a base or support, a series of fingers or coils, holding-bars connected to the end coils and projecting into the coils and means for attaching the bars to the base or support and thereby clamping the fingers or coils onto the base or support, substantially as set forth.

6. In a rack for penholders, &c., the combination of a base or support provided with projections, a series of fingers or coils provided with eyes adapted to engage such projections and holding-bars extending from the eyes into the coils, the end of each bar being provided with a collar surrounding the other bar, substantially as set forth.

7. In a rack for penholders, &c., the combination of a base or support provided with projections, a series of fingers or coils provided with eyes adapted to engage such projections, holding-bars extending from the eyes into the coils, the end of each bar being provided with a collar surrounding the other bar, and a spring interposed between said collars, substantially as set forth.

8. In a rack for penholders, &c., the combination of a base or support, a series of coils, a portion having a pitch or inclination in one direction and the other portion having a pitch or inclination in the opposite direction, the connecting portion of such oppositely-pitched coils being tangential to the coils, and means for detachably connecting the coils to the base or support, substantially as set forth.

9. In a rack for penholders, pencils, &c., the combination of a base or support, a series of fingers or coils and a covering for said coils or fingers adapted to form a gripping-surface, substantially as set forth.

10. In a rack for penholders, &c., the combination of a base or support, a series of fingers or coils having beads arranged thereon, substantially as set forth.

In testimony whereof I have hereunto set my hand.

JAMES ADAIR.

Witnesses:
DARWIN S. WOLCOTT,
F. E. GAITHER.